United States Patent
Whittaker

(10) Patent No.: US 7,283,480 B1
(45) Date of Patent: Oct. 16, 2007

(54) NETWORK SYSTEM HEALTH MONITORING USING CANTOR SET SIGNALS

(75) Inventor: G. Allan Whittaker, Alpharetta, GA (US)

(73) Assignee: Lockheed Martin Corporation, Bethesda, MD (US)

( * ) Notice: Subject to any disclaimer, the term of this patent is extended or adjusted under 35 U.S.C. 154(b) by 937 days.

(21) Appl. No.: 10/293,384

(22) Filed: Nov. 12, 2002

(51) Int. Cl.
*G01R 31/08* (2006.01)

(52) U.S. Cl. ..................... 370/245; 370/252

(58) Field of Classification Search ............ 370/241, 370/242, 245, 252
See application file for complete search history.

(56) References Cited

U.S. PATENT DOCUMENTS

| | | |
|---|---|---|
| 3,883,217 A | 5/1975 | Love et al. |
| 3,887,876 A | 6/1975 | Zeidler |
| 3,936,141 A | 2/1976 | Milton |
| 3,943,358 A | 3/1976 | Reymond et al. |
| 4,054,366 A | 10/1977 | Barnoski et al. |
| 4,166,946 A | 9/1979 | Chown et al. |
| 4,234,969 A | 11/1980 | Singh |
| 4,249,266 A | 2/1981 | Nakamori |
| 4,301,543 A | 11/1981 | Palmer |
| 4,307,933 A | 12/1981 | Palmer et al. |
| 4,317,614 A | 3/1982 | Palmer |
| 4,366,565 A | 12/1982 | Herskowitz |
| 4,367,460 A | 1/1983 | Hodara |
| 4,400,054 A | 8/1983 | Biard et al. |
| 4,423,922 A | 1/1984 | Porter |
| 4,435,849 A | 3/1984 | Ilgner et al. |
| 4,446,515 A | 5/1984 | Sauer et al. |
| 4,457,581 A | 7/1984 | Johnson et al. |
| 4,482,980 A | 11/1984 | Korowitz et al. |
| 4,506,153 A | 3/1985 | Ohno |
| 4,543,574 A | 9/1985 | Takagi et al. |
| 4,545,074 A | 10/1985 | Balliet et al. |
| 4,554,511 A | 11/1985 | Braun |
| 4,577,184 A | 3/1986 | Hodara et al. |
| 4,595,839 A | 6/1986 | Braun et al. |
| 4,630,256 A | 12/1986 | Albanese |
| 4,654,890 A | 3/1987 | Hasegawa et al. |
| 4,671,608 A | 6/1987 | Konishi |
| 4,674,830 A | 6/1987 | Shaw et al. |

(Continued)

FOREIGN PATENT DOCUMENTS

DE 4226838 2/1974

(Continued)

OTHER PUBLICATIONS

Stewart D. Personick, *Optical Fiber Transmission Systems*, pp. 1-3 (1981).

(Continued)

*Primary Examiner*—Brian Nguyen
(74) *Attorney, Agent, or Firm*—Kilpatrick Stockton LLP

(57) ABSTRACT

Non-invasive systems and methods monitor network system health by monitoring signals inherently on the network. These signals are deciphered and characterized using Cantor set theory such that a signature of the network is determined. Variations in the characteristics of the reflected signals indicate a network event, such as changes in network topology often due to device degradation, system failure, or physical intrusion. The source of the reflected signals can be characterized and the location on the network identified.

13 Claims, 4 Drawing Sheets

U.S. PATENT DOCUMENTS

| | | |
|---|---|---|
| 4,705,350 A | 11/1987 | Cheng |
| 4,715,012 A | 12/1987 | Mueller, Jr. |
| 4,717,229 A | 1/1988 | Cutler |
| 4,731,784 A | 3/1988 | Keller et al. |
| 4,739,183 A | 4/1988 | Tokura et al. |
| 4,756,595 A | 7/1988 | Braun et al. |
| 4,759,011 A | 7/1988 | Hicks, Jr. |
| 4,761,833 A | 8/1988 | Epworth |
| 4,786,130 A | 11/1988 | Georgiou et al. |
| 4,810,052 A | 3/1989 | Fling |
| 4,829,593 A | 5/1989 | Hara |
| 4,845,483 A | 7/1989 | Negishi |
| 4,850,047 A | 7/1989 | Iguchi et al. |
| 4,883,335 A | 11/1989 | Alferness et al. |
| 4,898,565 A | 2/1990 | Braun |
| 4,932,004 A | 6/1990 | Hodara et al. |
| 4,946,244 A | 8/1990 | Schembri |
| 4,947,134 A | 8/1990 | Olsson |
| 4,948,218 A | 8/1990 | Kobayashi et al. |
| 4,958,354 A | 9/1990 | Urakami et al. |
| 4,959,837 A | 9/1990 | Fevrier et al. |
| 5,029,306 A | 7/1991 | Bull et al. |
| 5,046,137 A | 9/1991 | Kurobe et al. |
| 5,055,827 A | 10/1991 | Philipp |
| 5,058,101 A | 10/1991 | Albanese et al. |
| 5,058,974 A | 10/1991 | Mollenauer |
| 5,080,505 A | 1/1992 | Epworth |
| 5,083,874 A | 1/1992 | Aida et al. |
| 5,117,196 A | 5/1992 | Epworth et al. |
| 5,117,303 A | 5/1992 | Desurvire et al. |
| 5,129,019 A | 7/1992 | Robberg et al. |
| 5,133,031 A | 7/1992 | Tanaka et al. |
| 5,179,603 A | 1/1993 | Hall et al. |
| 5,181,134 A | 1/1993 | Fatehi et al. |
| 5,185,735 A | 2/1993 | Ernst |
| 5,187,605 A | 2/1993 | Shikata et al. |
| 5,189,541 A | 2/1993 | Konishi |
| 5,212,577 A | 5/1993 | Nakamura et al. |
| 5,222,166 A | 6/1993 | Weltha |
| 5,267,071 A | 11/1993 | Little et al. |
| 5,283,687 A | 2/1994 | Hsu et al. |
| 5,296,957 A | 3/1994 | Takahashi et al. |
| 5,307,197 A | 4/1994 | Tanabe et al. |
| 5,309,564 A | 5/1994 | Bradley et al. |
| 5,315,424 A | 5/1994 | Boden et al. |
| 5,317,580 A | 5/1994 | Auffret et al. |
| 5,319,642 A | 6/1994 | Ota |
| 5,345,230 A | 9/1994 | Jackson et al. |
| 5,347,384 A | 9/1994 | McReynolds et al. |
| 5,361,262 A | 11/1994 | Cheung |
| 5,363,367 A | 11/1994 | Kobayashi et al. |
| 5,369,516 A | 11/1994 | Uchida |
| 5,392,154 A | 2/1995 | Chang et al. |
| 5,412,746 A | 5/1995 | Rossberg et al. |
| 5,414,416 A | 5/1995 | Yamakita et al. |
| 5,424,864 A | 6/1995 | Emura |
| 5,432,874 A | 7/1995 | Muraguchi |
| 5,434,861 A | 7/1995 | Pritty et al. |
| 5,471,342 A | 11/1995 | Junginger et al. |
| 5,479,082 A | 12/1995 | Calvani et al. |
| 5,481,478 A | 1/1996 | Palmieri et al. |
| 5,483,233 A | 1/1996 | Pettitt et al. |
| 5,500,857 A | 3/1996 | Nakata |
| 5,500,867 A | 3/1996 | Krasulick |
| 5,502,589 A | 3/1996 | Yamamoto et al. |
| 5,506,709 A | 4/1996 | Segal et al. |
| 5,508,689 A | 4/1996 | Rado et al. |
| 5,517,622 A | 5/1996 | Ivanoff et al. |
| 5,528,408 A | 6/1996 | McGinley |
| 5,533,153 A | 7/1996 | Ota |
| 5,539,558 A | 7/1996 | Yonemura et al. |
| 5,541,957 A | 7/1996 | Lau |
| 5,548,431 A | 8/1996 | Shin et al. |
| 5,552,921 A | 9/1996 | Hetzel et al. |
| 5,572,612 A | 11/1996 | Delavaux et al. |
| 5,615,290 A | 3/1997 | Harasawa et al. |
| 5,623,169 A | 4/1997 | Sugimoto et al. |
| 5,664,035 A | 9/1997 | Tsuji et al. |
| 5,684,899 A | 11/1997 | Ota |
| 5,712,932 A | 1/1998 | Alexander et al. |
| 5,712,937 A | 1/1998 | Asawa et al. |
| 5,717,795 A | 2/1998 | Sharma et al. |
| 5,732,086 A | 3/1998 | Liang et al. |
| 5,745,479 A | 4/1998 | Burns et al. |
| 5,764,821 A | 6/1998 | Glance |
| 5,777,561 A | 7/1998 | Chieu et al. |
| 5,778,118 A | 7/1998 | Sridhar |
| 5,793,908 A | 8/1998 | Mizuochi et al. |
| 5,796,890 A | 8/1998 | Tsuji et al. |
| 5,801,865 A | 9/1998 | Weis et al. |
| 5,809,187 A | 9/1998 | Peck, Jr. et al. |
| 5,815,294 A | 9/1998 | Ishikawa et al. |
| 5,825,515 A | 10/1998 | Anderson |
| 5,825,949 A | 10/1998 | Choy et al. |
| 5,838,989 A | 11/1998 | Hutchison et al. |
| 5,854,698 A | 12/1998 | Eskildsen et al. |
| 5,866,898 A | 2/1999 | Hodgson et al. |
| 5,880,863 A | 3/1999 | Rideout et al. |
| 5,894,362 A | 4/1999 | Onaka et al. |
| 5,896,417 A | 4/1999 | Lau |
| 5,898,673 A | 4/1999 | Riggan et al. |
| 5,898,801 A | 4/1999 | Braun et al. |
| 5,901,260 A | 5/1999 | Braun et al. |
| 5,910,851 A | 6/1999 | Flaherty |
| 5,937,032 A | 8/1999 | Nummelin et al. |
| 5,943,148 A | 8/1999 | Hamel et al. |
| 5,949,560 A | 9/1999 | Roberts et al. |
| 5,959,412 A | 9/1999 | Ushijima |
| 5,995,258 A | 11/1999 | Weber et al. |
| 6,008,915 A | 12/1999 | Zyskind |
| 6,014,481 A | 1/2000 | Kremers |
| 6,075,628 A | 6/2000 | Fisher et al. |
| 6,075,648 A | 6/2000 | Yamamoto et al. |
| 6,084,233 A | 7/2000 | Hodgson et al. |
| 6,111,888 A | 8/2000 | Green et al. |
| 6,122,095 A | 9/2000 | Fatchi |
| 6,128,111 A | 10/2000 | Roberts |
| 6,140,920 A | 10/2000 | Roberts |
| 6,157,725 A | 12/2000 | Becker |
| 6,175,533 B1 | 1/2001 | Lee et al. |
| 6,345,137 B1 | 2/2002 | Imajo |
| 6,385,366 B1 | 5/2002 | Lin |
| 6,426,815 B1 | 7/2002 | Koehler |
| 6,449,072 B1 | 9/2002 | Sian et al. |
| 6,499,027 B1 | 12/2002 | Weinberger |
| 6,502,131 B1* | 12/2002 | Vaid et al. ............... 709/224 |
| 6,567,197 B1 | 5/2003 | Glance |
| 6,782,422 B1* | 8/2004 | Bahl et al. ............... 709/224 |
| 6,784,837 B2 | 8/2004 | Revankar et al. |
| 6,830,221 B1 | 12/2004 | Janson et al. |
| 6,912,339 B2 | 6/2005 | Whittaker |
| 2002/0018260 A1 | 2/2002 | Kisovec et al. |
| 2002/0032780 A1* | 3/2002 | Moore et al. ............ 709/228 |
| 2002/0044565 A1 | 4/2002 | Park |
| 2002/0065962 A1 | 5/2002 | Bakke et al. |
| 2002/0083169 A1* | 6/2002 | Aki et al. ................. 709/224 |
| 2002/0101636 A1 | 8/2002 | Xiao et al. |
| 2002/0101874 A1 | 8/2002 | Whittaker et al. |
| 2003/0176196 A1* | 9/2003 | Hall et al. ............... 455/456.1 |
| 2003/0204789 A1* | 10/2003 | Peebles et al. ............ 714/47 |
| 2003/0206134 A1 | 11/2003 | Lier et al. |
| 2004/0043795 A1 | 3/2004 | Zancewicz |
| 2004/0076429 A1 | 4/2004 | Meroth et al. |
| 2004/0076434 A1 | 4/2004 | Whittaker et al. |

2005/0213973 A1  9/2005  Rohrer et al.

FOREIGN PATENT DOCUMENTS

| DE | 3007958 A1 | 3/1984 |
|---|---|---|
| DE | 3807072 A1 | 8/1988 |
| DE | 3938856 A1 | 11/1989 |
| DE | 4331330 A1 | 9/1993 |
| DE | 4427187 A1 | 2/1996 |
| EP | 0 069 356 A2 | 1/1983 |
| EP | 000103873 A2 | 3/1984 |
| EP | 0 105 753 A2 | 4/1984 |
| EP | 0 164 652 A2 | 12/1985 |
| EP | 0 231 635 A2 | 8/1987 |
| EP | 0 356 090 A2 | 2/1990 |
| EP | 0 393 293 | 10/1990 |
| EP | 0 905 936 A2 | 3/1991 |
| EP | 0 451 426 | 10/1991 |
| EP | 0 503 212 | 9/1992 |
| EP | 0 739 103 A2 | 10/1996 |
| EP | 0 744 797 A1 | 11/1996 |
| FR | 2574565 | 6/1986 |
| GB | 2073877 | 10/1981 |
| GB | 2087679 | 5/1982 |
| GB | 2102232 | 1/1983 |
| GB | 2189961 | 11/1987 |
| GB | 2255683 | 11/1992 |
| JP | 11-87823 | 7/1989 |
| JP | 7-202921 | 8/1995 |
| JP | 9/51322 | 2/1997 |
| JP | 9-321739 | 12/1997 |
| JP | 10-107773 | 4/1998 |
| JP | 11-331224 | 3/1999 |
| WO | WO 93/03406 | 2/1993 |
| WO | WO 00/57582 | 9/2000 |

OTHER PUBLICATIONS

H. Hodara, and E. Miles, "*High-Speed Local Area Networks*", Fiber and Integrated Optics; (1992) pp. 253-277.

N.A. Olsson, *Lightwave Systems With Optical Amplifiers*, Journal of Lightwave Technology. pp. 1071-1082 (Jul. 1989).

ITU-T Recommendation G.681, Series G: Transmission Systems and Media, Digital Systems and Networks; Functional characteristics of interoffice and long-haul systems using optical amplifiers, including optical multiplexing (Oct. 1996).

ITU-T Recommendation G.692, Series G: Transmission Systems and Media, Digital Systems and Networks; Optical interfaces for multichannel systems with optical amplifiers (Oct. 1998).

Chart and figures for optical fiber cable and baseband transmission, available at http://www.microsift.com/technet/WFW/wfw31/1_ch1.asp.

HDR 7.0 2 73; 7.0 Fiber Optic Ethernet—Types FOIRL and 10 BASE-F available at http://www.uni-trier.de/infos/ether/ethernet-guide/ethernet-guide.html.

3.0 IEEE Acronyms, available at http://spacey.net/ldavis/Design_Ethernet_Note.html, no date.

Fibre Channel—Overview of the Technology, Sep. 9, 2000, pp. 1-9 available at http://fibrechannel.org/technology.

Bi-Directional Optical Backplane Bus for Board to Board Optoelectronic Interconnects, Gicheri Kim, Jinghuai Fa and Ray T. Chen, 1-4 (Sep. 9, 2000) available at http://ece.utexas.edu/projects/ece/mrc/profs/chen_projects/optbus/optbus.html.

SOME Bus (Simultaneous Optical Multiprocessor Exchange Bus)(Sep. 9, 2000) available at http://eb.uah.edu/~cohen/some_bus/some_bus.html.

Integrated Explorations of the Spectral, Temporal and Spatial Degrees of Freedom 1 (Sep. 9, 2000) available at http://thebusinessedge.com/reruns/cito/sargent/sld001.htm.

Challenges In IP LANs on Higher-Dimensional Encoding (slide 4) (Sep. 9, 2000) available at http://thebusinessedge.com/reruns/cito/sargent/sld004.htm.

0034-P PCI 1-Gig Fibre Channel Optical Host Bus Adapter 1-4 available at http://solutions.sun.com/dbsearch/index.cgi?STATE=product&CMD=show&p_id=58181 (Sep. 9, 2000).

Architectural and Engineering Issues for Building an Optical Internet 1-55 (Sep. 9, 2000) available at http://www.canet3.net/papers/ArchandEngIssues.html.

Baker, *Monomode Fiber-Optic Design with Local- Area and Long-Haul Network Applications*, pp. 370-371.

Karim, *Chapter 9: Electro-Optical Devices and Systems*, Fiber-Optics-Based Devices and Systems, pp. 434-435.

Chinlon Lin, *Systems Applications of WDM Technologies in Optical Communications*, SPIE-International Society for Optical Engineering (Aug. 15-18, 1994).

Manuel Lopez-Amo, Loudon T Blair & Paul Urquhart, *Wavelength-Division-Multiplexed distributed optical fiber amplifier bus network for data and sensors*, Optics Letter 1159-61 (Jul. 15, 1993).

Francesco Matera & Marina Settembre, *Performance Evaluation of Optically Amplified Systems Operating in Optical Networks*, Microwave & Optical Technology Letters (Nov. 1996).

Spirit et al., *140-km 20-Gbit/s repeaterless transmission employing distributed erbium amplification*, Optical Fiber Communication Conference (1992).

Philip J. Koopman, Jr., and Bhargav P. Upender., "Time Division Multiple Access Without a Bus Master," United Technologies Research Center, UTRC Technical Report RR-9500470 (Jun. 1995).

Technical Report CSRI-298 entitled "A New Binary Logarithmic Arbitration Method for Ethernet," by Mart L. Molle of Computer Systems Research Institute, pp. 1-57 (Apr. 1994).

WRL Research Report 88/4 entitled "Measured Capacity of an Ethernet: Myths and Reality" by David R. Boggs, et al., printed by Digital Western Research Laboratory, Palo Alto, California (Sep. 1998) (pp. 1-31), originally published in *Proceedings of the SIGCOMM '88 Symposium on Communications Architectures and Protocols*, ACM SIGCOMM, Stanford, California, Aug. 1988.

Yamashita, et al., "Studies of a system gathering multi-channel visual signals using a single optical fiber and a bi-directional optical amplifier," *T.IEE Japan*, 119-C(12):1528-1534 (1999).

Kempainen, "Optical Networking lightens carrier-backbone burden," *EDN*, pp. 63, 64, 65, 66, 68, 70, 72 (Oct. 8, 1998).

Thomas, et al., "Physics in the Whirlwind of Optical Communications," *Physics Today*, pp. 30-36 (Sep. 2000).

Press Release entitled "Lucent Technologies announces record-breaking 320-channel optical networking system," (pp. 1-2) (Apr. 17, 2000).

Iannone, et al., "A 160-km transparent metro WDM ring network featuring cascaded erbium-doped waveguide amplifiers," published by Optical Society of America (2000).

"Performance Management -Management of SONET Networks—White Paper," Clear Communications, *Sonet and Performance Management*, Issue 1, Apr. 1996 (pp. 1-21).

Cisco Wavelength Router Manager—Data Sheet, www.cisco.com/warp/public/cc/so/neso/olso/cwrm_ds.htm (Apr. 25, 2001).

Keyserling, A. and R.C.L., "Chapter 2: Number, Dimensions, Manderlbrot, Chaos, 4 Attractors, Music and Color," www.chanceandchoice.com/ChanceandChoice/chapter2.html.

Gallardo, et al., "Fast Simulation of Broadband Telecommunications Networks Carrying Long-Range Dependent Bursty Traffic," Preceedings of the 1999 Winter Simulation Conference, pp. 374-381 (Winter 1999).

Willinger, et al., "Self-Similarity Through High-Variability: Statistical Analysis of Ethernet LAN Traffic at the Source Level," pp. 1-31 (Apr. 15, 1997).

DeCotignie, J.D., et al., "Producer-Distributor-Consumer Model on Controller Area Network," Proceedings of the IFAC/IFIC Workshop, Real Time Programming, 1995, pp. 35-42, XP002074139, Oxford, Great Britain.

Liew, "A Broad-Band Optical Network Based on Hierarchical Multiplexing of Wavelengths and RF Subcarriers," *Journal of Lightwave Technology*, 7(11):1825-1838 (1989).

Al-Raweshidy and Komaki (Editors), "Basic Microwave Properties of Optical Links," *Radio Over Fiber Technologies for Mobile Communication Networks*, pp. 7-16 (Published by Artech House, Norwood, Massachusetts) (2002).

Fibre Channel Overview http://his.web.cem.ch/HIS/fcs/spec/overview/htm, pp. 1-10 (Nov. 5, 2002).

Ethernet FAST Ethernet Fiber Optic Media Converters, http://www.versitron.com/Ethernet.html, 2 pages (Nov. 5, 2002).

HomeNetHelp.com, http://www.homenethelp.com/web/explain.about-hubs-and-switches.asp, 5 pages (Nov. 5, 2002).

Fibre Channel, http://www.iol.unh.edu/training/fc/fc_tutorial.html, 22 pages (Nov. 5, 2002).

International Search Report in related Application No. PCT/US03/03310.

International Search Report in related Application No. PCT/US03/03329.

International Search Report in related Application No. PCT/US03/10053.

International Search Report in related Application No. PCT/US03/30326.

International Search Report in related Application No. PCT/US03/29970.

* cited by examiner

NETWORK SYSTEM HEALTH MONITORING USING CANTOR SET SIGNALS

FIELD OF THE INVENTION

The invention relates to systems and methods of monitoring a network, and more specifically to systems and methods of monitoring the health of a network having traveling waves.

BACKGROUND OF THE INVENTION

Any communications network, regardless of whether it utilizes optical or electromagnetic signals, is susceptible to a variety of occurrences that can impact the health of the system. System health includes parameters that reflect the performance, efficiency and security of signal transmission. In particular, networks can experience component failure, signal interference, and intrusive access by unauthorized parties. Systems and methods of monitoring system health have been employed to predict, prevent, and to detect these network irregularities.

One approach taken by many system health monitoring protocols is to transmit a "supervisory," "test," or "monitoring" signal having a known characteristic, and then to check the characteristics of the signal when it is received at another point on the network. Some examples of these types of systems are disclosed in U.S. Pat. Nos. 5,345,230 to Jackson, 5,483,233 to Pettit, 5,712,937 to Asawa, 5,825,515 to Anderson, 5,894,362 to Onaka, 5,937,032 to Nummelin, and 5,055,827 to Philipp. For example, the Jackson patent describes a method of applying a signal having a known characteristic to an optical transceiver, coupling its transmitter to its receiver, and comparing the characteristics of the resulting output signal to those of the known input signal, thereby verifying the proper operation of the transceiver and the communication link.

However, such an approach of monitoring has several disadvantages. For one, the supervisory signal consumes valuable bandwidth. In addition, these systems also consume resources in transmitting, detecting, and processing the supervisory signals. Furthermore, some systems using the supervisory signal methodology also employ a series of repeaters stationed along the system that aid in the determination of the location of the irregularity, and possibly the device involved. This added facet requires the additional expense and labor involved with installing a repeater whenever a new device is placed into service.

An approach adopted in Ethernet systems is to detect collisions of data packets that have been transmitted concurrently from more than one node. When a collision is detected, the problem may be resolved by causing all network nodes to temporarily cease transmission while the system recovers. Such an approach may ensure the successful delivery of data packets, but otherwise does not provide much useful information on the health of a network. An example of this type of system is disclosed in U.S. Pat. No. 5,185,735 to Ernst. The Ernst patent describes a LAN noise monitor that detects positive voltage on LAN cable. Upon detecting positive voltage on the LAN cable, the LAN noise monitor indicates the presence, and possibly the amount, of noise to a LAN sentinel. However, the LAN sentinel of Ernst can only determine the presence and approximate location of LAN noise if a number of nodes are electrically connected to the LAN cable through LAN noise monitors.

There are also approaches that monitor other inherent characteristics of the communications transmissions themselves, such as diffraction of the signals, signal strength, wavelength, depolarization, change in phase, or nonlinear processes. A common feature in these approaches is the establishment of a threshold level, which if exceeded, indicates the presence of a problem. However, without positioning expensive repeaters or reflectometers strategically along the system, the location and source of the fault cannot be readily determined. An example of this approach is described in U.S. Pat. No. 5,471,342 to Junginger. The Junginger patent discloses monitoring an amplifier by measuring the scattered light coming from a splice area. However, the method of Junginger is directed to monitoring at a specific location, rather than monitoring an entire network or network segment.

Because of a desire to allocate bandwidth and to identify nodes on a network, networks typically have some administrator whose sole job is to oversee operation of the network. The administrator may oversee the physical components of the network, such as the network medium, network cards, the nodes, as well as any hubs, repeaters, switches, or bridges. Additionally, the administrator manages the addition or deletion of nodes from the network and the accompanying change in addressing. The administrator also performs maintenance, upgrades, and other periodic work on the network. The administration of a network can therefore be rather costly to an organization.

Considering the foregoing, what is needed is the ability to identify the location and nature of network irregularities that bear upon system health, without decreasing bandwidth that is available to the network. There is further need to implement a comprehensive means of monitoring without adding redundant and expensive equipment to the network.

SUMMARY OF THE INVENTION

The present invention addresses the problems above by providing systems and methods for monitoring the health and security of a network without the consumption of bandwidth with supervisory signals or the installation of periodic repeaters. Further, systems according to the invention detect the existence of network irregularities and can be located anywhere within the network. The systems preferably are also able to determine the location and cause of such irregularities.

According to a preferred embodiment, the systems continually or intermittently receive and isolate unique signals that are inherently produced in optical, electromagnetic, and other networks having traveling waves. The systems use Cantor set theory to detect and isolate the signals. The systems decipher characteristics of these signals, thereby revealing the topology of the network and any variations in the associated Cantor set. By monitoring the signals over time, the systems can detect changes in the Cantor sets, which are indicative of a network event. For example, the systems may be used to monitor and detect changes in network system health, component failure, signal interference, or intrusive access by unauthorized parties.

Systems and methods according to a preferred embodiment of the invention have many advantages over conventional methods of system health monitoring. For example, the systems do not consume bandwidth within the network, do not require detailed analysis of data by a network administrator, do not require repeating devices, and can identify the location and cause of network irregularities. In a preferred embodiment, the systems are implemented in an optical transport system similar to the one disclosed in U.S. Pat. No. 5,898,801, issued to Braun et al. Such an optical transport system, in a preferred embodiment also implements a similar encapsulation method to the one disclosed in U.S. patent application Ser. No. 09/924,037. However, the invention can be implemented in a number of different networks and network topologies.

Other advantages and features of the invention will be apparent from the description below, and from the accompanying papers forming this application.

BRIEF DESCRIPTION OF DRAWINGS

The accompanying drawings, which are incorporated in and form a part of the specification, illustrate preferred embodiments of the present invention and, together with the description, disclose the principles of the invention. In the drawings:

FIG. 3 is a diagram that illustrates the generation of a classical Cantor set.

DETAILED DESCRIPTION OF THE INVENTION

Reference will now be made in detail to preferred embodiments of the invention, non-limiting examples of which are illustrated in the accompanying drawings.

I. Overview

Systems and methods according to preferred embodiments of the invention employ methods of monitoring network health that have many advantages over existing network health monitoring methods. In an exemplary embodiment, systems detect network events by monitoring signals inherently on a network. The systems detect and isolate the signals using Cantor set theory and, from these signals, are able to determine a "signature" of a network. The systems monitor these signals and compare them to subsequent signals received over the network in order to detect a network event, such as a variation in the network topology. The systems preferably are also able to determine the cause and location of the network event.

The systems and methods according to the invention can be implemented in any network that has traveling waves. These networks include, but are not limited to, electrical, radio frequency, and optical networks and the transmission medium includes, but is not limited to, coaxial cable, twisted-pair, electrical busses, optical fiber, or other waveguides. In an exemplary environment, the systems are employed in a communications network. The systems are connected to the network in order to detect Cantor set signals. The systems monitor the Cantor set signals to detect changes in the Cantor set signals indicative of a network event. The systems preferably are also able to interpret and decipher the Cantor set signals to map the topology of the network. The topology at one point in time is compared to the topology at a later point in time in order to detect variations in the network topology. Variations in the network topology are analyzed to assess network system health.

II. Exemplary Network

For the purposes of this description, the systems according to the invention will be described with reference to a communications network. In general, a communications network can be any network that transmits any combination of voice, video, discrete signals, analog signals, radio frequency (RF) and/or digital data between targeted stations. As mentioned above, the systems may be used with any type of transmission media that inherently has traveling waves, such as cables, optical fibers, busses, and other waveguides. In addition to the stations themselves within the network, the network may also include supporting components, such as bridges, repeaters, routers, and switches as well as antennas and towers. Further, the systems are not limited to any particular network topology and instead may be used with ring, broken ring, point-to-point, star, or other types of busses.

Figure 1:
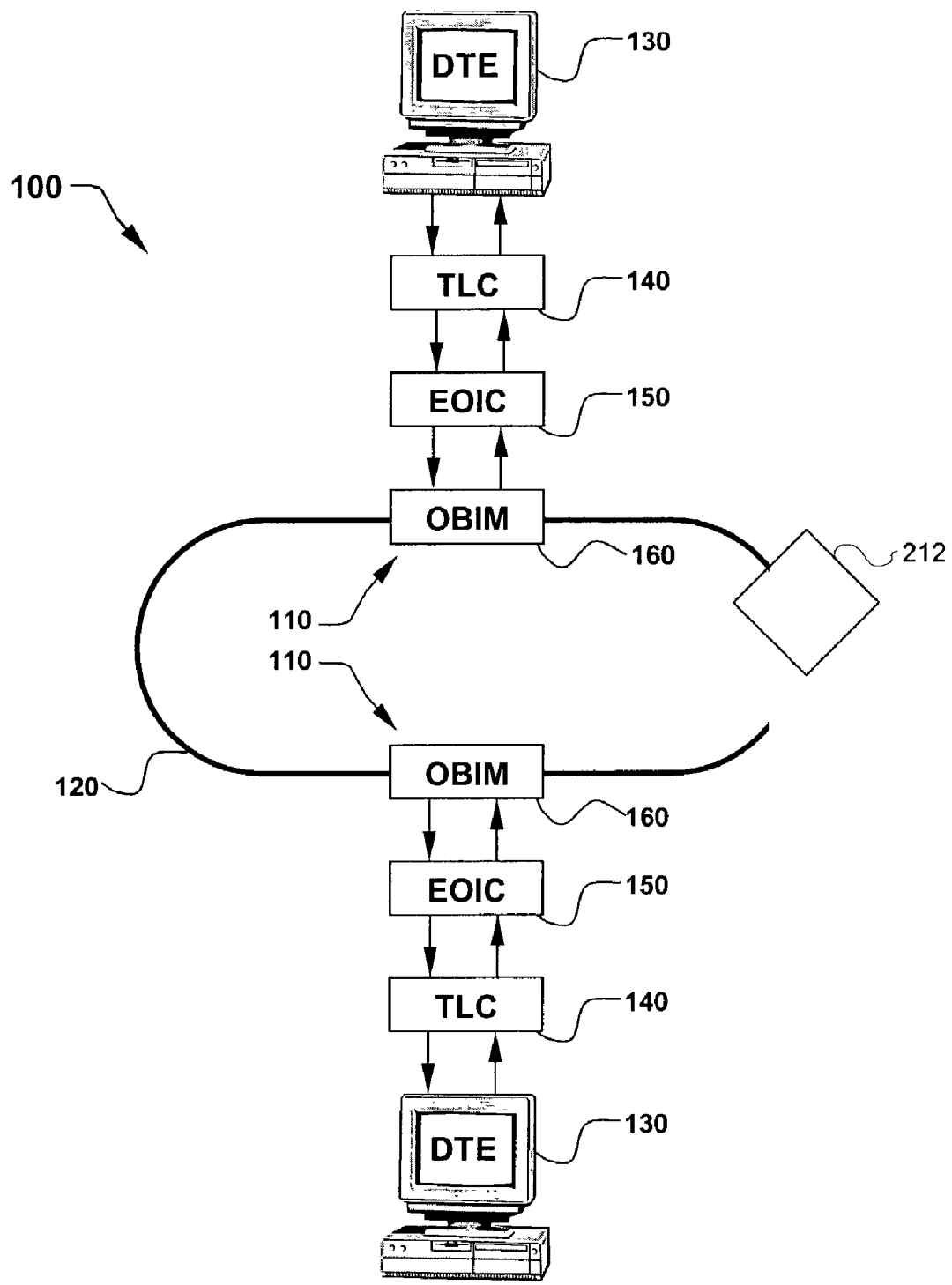
FIG. 1 is a logical diagram of an optical transport system having a monitoring system according to a preferred embodiment of the invention.

In a preferred embodiment of the invention, the communications network is an optical transport system. FIG. 1 provides an illustration of an exemplary optical transport system 100, as described in U.S. Pat. No. 5,898,801, issued to Braun et al. An optical transport system includes a plurality of nodes 110 connected to a bi-directional optical transmission bus 120. An optical bus interface module (OBIM) 160 connects each node 110 to the bus 120 by directing signals traveling in either direction along the bus 120 toward the node 110 and by routing signals from each node 110 onto the bus 120 in both directions.

The nodes 110 will vary with the type of network 100 and with the purpose, design, and layout of the network 110. For example, each node 110 can includes Data Terminal Equipment (DTE) 130 and an Electro-Optical Interface Card (EOIC) 150 and optionally may have a Translation Logic Card (TLC) 140. The DTE 130 may comprise any type of device or system that issues communication signals, such as but not limited to computers, sensors, networks, routers, switches, radios, cameras, controllers, etc. The EOIC 150 provides any necessary optical-to-electrical conversion and electrical-to-optical conversion and the TLC provides any necessary translations between protocols.

III. Methods for Monitoring Network Health

Figure 2:
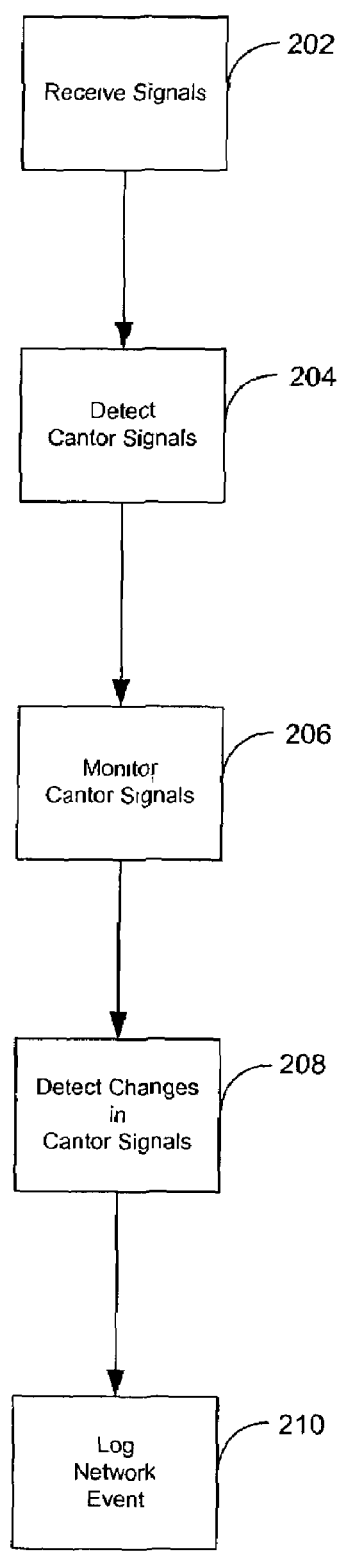
FIG. 2 is a flow chart of a method according to a preferred embodiment of the invention.

A method 200 for monitoring the health of a communications network according to an exemplary embodiment of the invention will now be described with reference to FIG. 2. At 202, signals traveling on a network are received and at 204 Cantor set signals are detected. The Cantor set signals can be detected in a number of ways, one of which will be described in more detail below. At 206, the Cantor set signals are monitored and at 208 changes in the Cantor set signals are detected. The Cantor set signals will normally fluctuate slightly over time and will not remain identical even for a given network configuration and health. Therefore, at 208, a change is determined to occur in the Cantor set signals when the fluctuations exceed some threshold, range, spectral content, phase shift, and/or polarization orientation. For example, these changes include the magnitude of the Cantor set signals, the frequency or wavelengths of the signals, and even the arrangement or configuration of the signals themselves forming the Cantor set. When a change does occur, at 210 a network event is considered to have occurred. Various additional functions may occur in response to a network event including, but not limited to, logging the event, sending alerts or notices, and taking appropriate reactive measures to the particular network event.

IV. Systems for Monitoring Network Health

According to an exemplary embodiment of this invention, a receiver 212 is positioned at a location on a network, or on a segment of a network, such that signal interactions generated in that network or network segment can be received. A preferred location for a receiver is at a preexisting node 110, although the receiver 212 may be located elsewhere. Receivers 212 are preferably integrated into the existing data terminal equipment (DTEs) 130. The receivers 212 could alternatively be located within the OBIMs 160 or other suitable couplers, within the EOICs 150, or within the TLCs 140.

The receiver 212 preferably has a filtering device, such as a fixed or tunable wavelength selective filter, to separate the Cantor set signals from intentionally transmitted signals. The receivers 212 also include a processor for use in detecting the Cantor set signals. The processor components may be of various forms in order to provide the capability to derive such Cantor set elements as, but are not limited to, the temporal components, the frequency or wavelength, the phase and the polarization of the characterizing signal. As such, the processor might contain microprocessors, field programmable gate arrays, and field programmable gate arrays with embedded processor cells like the Power PC, high-speed logic. In order to operate in real time, the preferred embodiment structure is highly parallel and reconfigurable. Special components in the processor include, but are not limited to, waveform analyzers, noise analyzers, Fourier transformers, polynomial transformers, polarization analyzers and phase shift detectors.

V. Detection of Cantor Set Signals

During normal operation, a network has distinctive signature created by such, but not limited to, physical properties as reflections of transmitted signals, automatic spontaneous emission of energy from the rare earth doped fiber amplifier, laser Relative Intensity Noise, detector shot noise, etc. Transmitted signals are reflected and interact for a variety of reasons, such as the presence of splices due to junctions or couplings, slight changes in the refractive index of the core of the fiber conductor such as Rayleigh scattering, or due to variations in conductor symmetry such as Mie scattering. Each network that has traveling waves inherently has a set of Cantor set signals.

Figure 3:
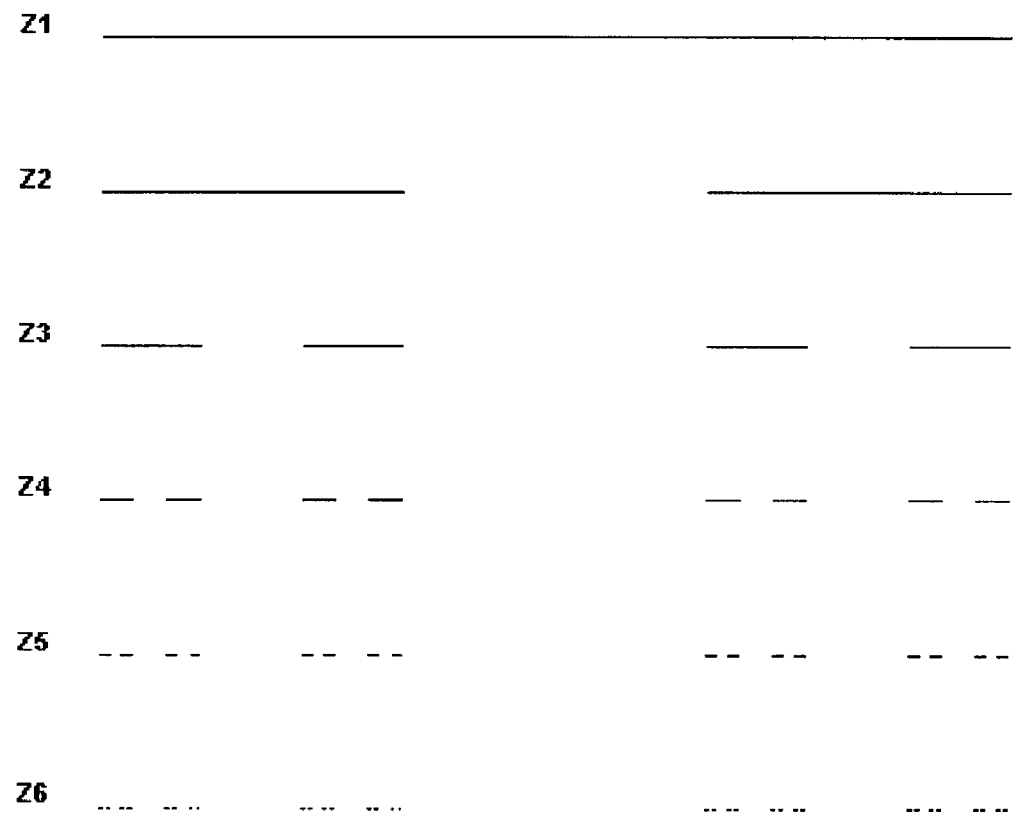

Seemingly random, these signals actually occur in time according to a fractal dimension similar to the one illustrated in FIG. 3, a mathematical model that is known as "Cantor's Dust". This model is created by drawing a single line in the first iteration $Z_1$, and removing its middle third in the second iteration $Z_2$, creating two lines and a void. In each subsequent iteration ($Z_3$ to $Z_n$), the middle third of each existing line is removed, until eventually all that is left is a series of dimensionless points that appear to be random. In this classic model, the line segment removed is equivalent to the segments remaining, and the middle segment is always removed. In other versions of the model however, the size and location of the segment removed can vary, thereby increasing the illusion of unpredictability.

In the preferred embodiment, the receiver 212 analyzes the seemingly random signals on the network. By applying Cantor set theory, the receiver 212 deciphers the detected signals to identify iterative patterns that indicate individual signals. The individual signals are then isolated and analyzed to determine the location and nature of the network irregularities that cause the reflection. A Cantor set signal is developed by first picking an I—the "Cantor Dust" iteration interval in time, frequency, phase and/or polarization in which to sample for the presence of network interactive signals. Then, as non-limiting examples, a Fourier Transform and/or a Gabor Transform are calculated. An analysis of the variations of this Cantor set with prior observations of the same Cantor set signal would produce measures of the network health and integrity. A newly derived Cantor set, whose variations are below monitoring thresholds, is statistically combined to improve the precision of the reference Cantor set. A newly derived Cantor set, whose variations are above monitoring thresholds, is used to start forming the basis of a new signature Cantor set for that location. Thus, the characterization of a network at a give detection node is the union of all Cantor sets derived for that node over network time of operation.

VI. Network Topology

Figure 4:
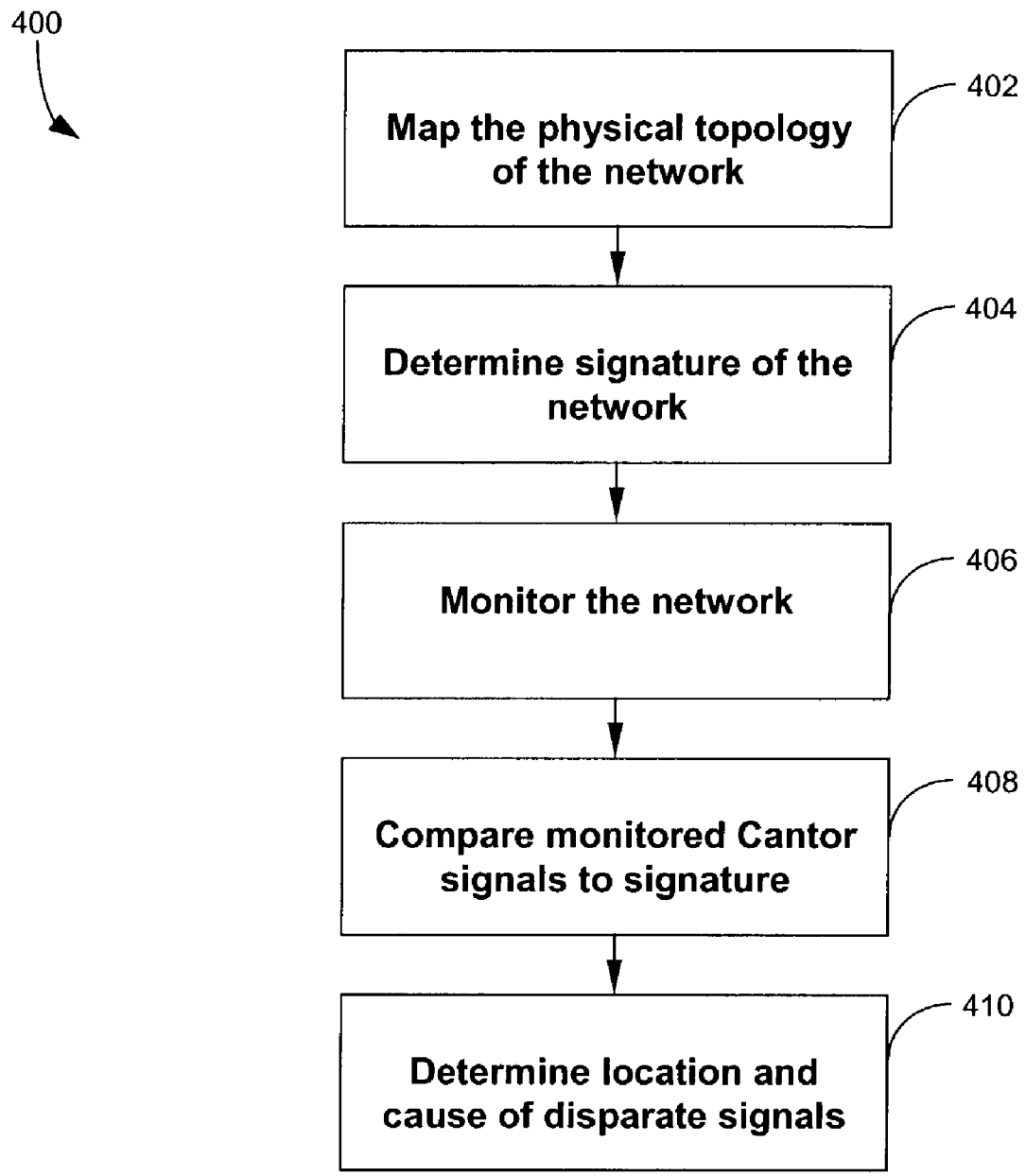
FIG. 4 is a flow chart of a method according to another embodiment of the invention.

According to yet another method of the invention, the systems and methods not only monitor the Cantor set signals and detect a network event, but the systems and methods additionally interpret the Cantor set signals. As mentioned above, the Cantor set signals are a function of the network and the health and integrity of a network. A method 400 of monitoring a network according to another embodiment of the invention will now be described with reference to FIG. 4. At 402, a map of the physical topology of the network is derived. This map may be input based on knowledge of the network or may be derived or estimated based on the Cantor set signals or through other measurements. At 404, a signature for the network is derived from the Cantor set signals. This signature is unique for a network and, furthermore, is typically unique for the current health or status of the network. This signature is also unique when measured at different locations in the network. At 406, the network is monitored and at 408 the monitored Cantor set signals are compared to the signature for the network. As mentioned above, the comparison of Cantor set signals may involve the use of some threshold values so that, unless the changes exceed those threshold values, the Cantor set signals are considered to match the signature. The comparison may also involve Fourier analysis to match the frequencies of the signals, measurement of the duration of the individual signals, or other characteristics of the signals. At 410, when a network event is determined to have occurred, the method 400 further involves determining the location and cause of the new set of Cantor set signals and the new signature for the network.

Thus, according to this embodiment of the invention, the physical topology of the network is mapped and recorded. The mapped topology is used to decipher the network's Cantor set signals, referred to above as its signature. Subsequent changes in the patterns of reflected signals symbolize a network event and those changes in the signals are analyzed to determine the new network topology. The Cantor sets produced is a function of where in the network the Cantor sets are formed. The reason for the differences is that light travels through different path lengths populated with different components. For example, there is no reason to expect that the signature as measured at one end of the bus would be identical with the signature measured at the other end of the bus simultaneously estimated using the same measurement device. Thus, having multiple Cantor set detectors in different physical locations would help to isolate where the change has occurred. When the Cantor set information is combined with the physical network map produced by an encapsulation method, such as that described in co-pending patent application Ser. No. 09/924,037, entitled "Physical Layer Transparent Transport Information Encapsulation Methods and Systems," filed on Aug. 7, 2001, which is incorporated herein by reference, then a more precise location can be achieved.

VII. Applications

The systems and methods according to the invention have numerous applications. For one, the systems and methods may be used to monitor the health of a network. Each station or node on a network can rather easily monitor the integrity of a waveguide without needing to transmit any supervisory, test, or monitoring signal. Furthermore, while the systems may be deployed at each station or node, the health of a network can be monitored anywhere within the network. The systems and methods can be used in networks to monitor the health or status and, furthermore, may be used in highly sensitive networks to ensure the security of the network. If the location and cause of the network event is known, the systems and methods may additionally send alerts or notifications about the event, dispatch personnel to fix the event, or to initiate other reactive measures to the network event. The systems and methods may be used to implement a network domain name server that correlates the user-designated names of the network components with the physical address of the mapped network.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

I claim:

1. A method for monitoring a network, comprising:
   receiving signals traveling within the network;
   detecting Cantor set signals contained within the signals traveling within the network;
   monitoring the Cantor set signals;
   detecting changes in the Cantor set signals; and
   determining that a network event has occurred when changes are detected in the Cantor set signals;
   wherein the network event is detected by monitoring the Cantor set signals on the network.

2. The method as set forth in claim 1, wherein detecting changes comprises determining if the Cantor set signals exceed a threshold value.

3. The method as set forth in claim 1, wherein receiving signals comprises receiving signals inherently traveling on the network.

4. The method as set forth in claim 1, wherein monitoring comprises periodically detecting the Cantor set signals.

5. A method for monitoring a health of a network, comprising:
   mapping a physical topology of a network;
   detecting Cantor set signals traveling within the network;
   determining a signature of the network from the Cantor set signals, the signature reflecting a health of the network at the physical topology which has been mapped;
   monitoring the Cantor set signals;
   detecting changes in the Cantor set signals from the signature; and
   detecting a network event from the changes in the Cantor set signals.

6. The method as set forth in claim 5, further comprising determining a characteristic of the network event.

7. The method as set forth in claim 5, further comprising determining a source of the network event.

8. The method as set forth in claim 5, further comprising determining a cause of the network event.

9. The method as set forth in claim 5, further comprising initiating a reactive measure in response to the network event.

10. The method as set forth in claim 9, wherein the reactive measure is a corrective measure for correcting the network event.

11. The method as set forth in claim 5, where monitoring of the Cantor set signals is performed continually.

12. The method as set forth in claim 5, where monitoring of the Cantor set signals is performed intermittently.

13. The method as set forth in claim 5, further comprising determining Cantor set signals that are missing from the signature.

* * * * *